March 17, 1931. J. A. C. KING 1,796,377
RAILWAY SIGNAL APPARATUS
Filed May 22, 1930
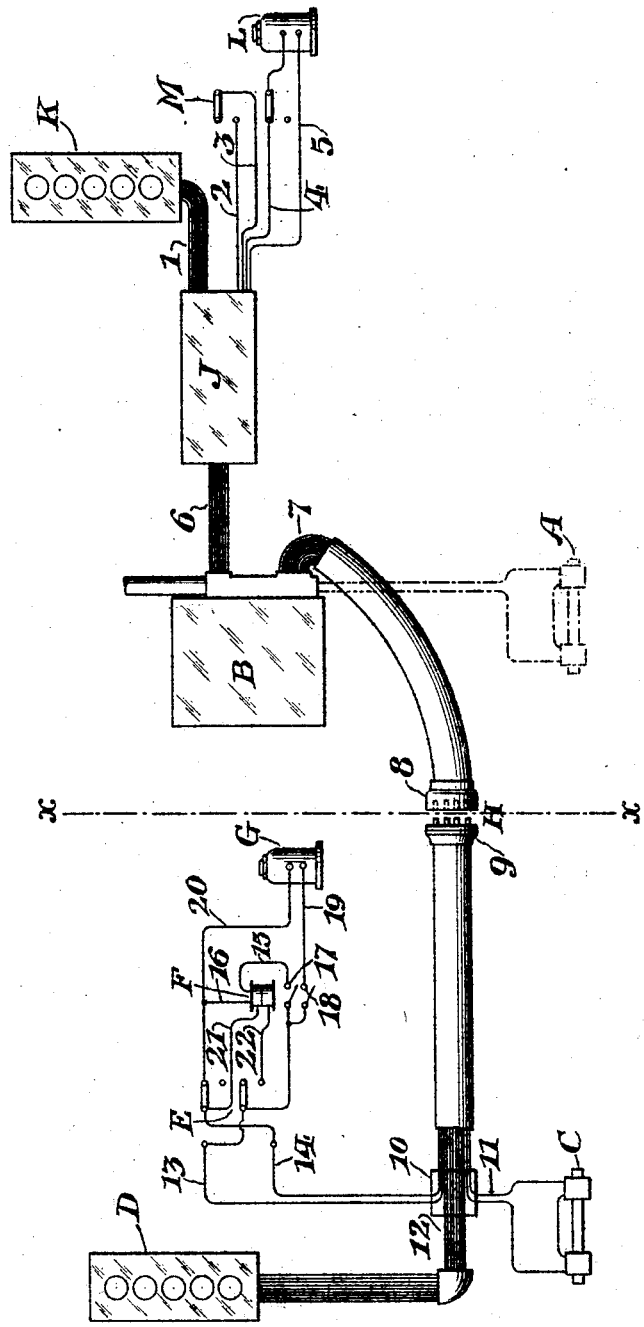
WITNESSES
John A. Weidler
George M. Muschamp
INVENTOR:
John A. C. King,
BY Fraley Paul
ATTORNEYS.

Patented Mar. 17, 1931

1,796,377

UNITED STATES PATENT OFFICE

JOHN A. C. KING, OF LANSDOWNE, PENNSYLVANIA

RAILWAY SIGNAL APPARATUS

Application filed May 22, 1930. Serial No. 454,614.

My invention relates to signal apparatus adapted for use on a railway vehicle moved ahead of a locomotive or the like equipped with means responsive to wayside signals for automatically producing a number of cab signal indications and means for acknowledging a change to a more restrictive indication. A locomotive so equipped with automatic cab signal devices and apparatus for acknowledging less favorable signals, such asknowledging apparatus serving to suppress the sounding of an alarm or serving to forestall an automatic train stop or serving to perform other acts, customarily carries a track signal receiver on the front end in advance of the truck wheels. When a vehicle, such as a snow plow, for example, is pushed ahead of a locomotive so equipped, the cab signals are nullified because the forward vehicle shunts signals from the underlying track circuit away from the track signal receiver and renders the latter inoperative. To equip the forward vehicle with a complete signal receiving apparatus such as is carried on a locomotive is a most expensive matter, and the principal object of this invention is to provide a comparatively simple and inexpensive unit adapted to be readily attached to any type of vehicle which may be moved ahead of a locomotive and adapted to serve not merely as a conductor for transmitting signals from the forward vehicle to the locomotive, but as a means for checking the integrity of the engineer and as a safeguard in case the engineer is negligent or incapacitated.

Further objects and advantages of the invention will be apparent from the description which follows and which has reference to the accompanying drawings, illustrating diagrammatically in a single figure one embodiment or example of the invention.

The apparatus shown at the left-hand side of the dot-and-dash line X—X in the drawing represents, diagrammatically, equipment adapted to be carried on a vehicle moved ahead of a locomotive, whereas the apparatus at the right-hand side of the line X—X represents diagrammatically standard equipment now carried on a locomotive operating with a continuous inductive cab signal system.

A track signal receiver indicated in broken lines at A is mounted on the front end of the locomotive, and this receiver being rendered inoperative when a vehicle is moved ahead of the locomotive, it is temporarily disconnected from the terminal board B on the locomotive. The instrumentalities for decoding signals transmitted from a track circuit to produce cab signal indications and to sound a warning alarm upon a change to a more restrictive indication are housed in a box J on the locomotive and they form no part of this invention in the practice of which any of the standard locomotive equipments used for this purpose may be employed. A group of conductors 1 lead from the box J to signal indicators K located in the locomotive cab, and another set of conductors 2, 3, 4 and 5 lead to an acknowledging switch M and to magnet L. While for the sake of simplicity of illustration, magnet L is represented in the drawings by a conventional symbol, it is to be assumed that magnet L forms a part of an electro-pneumatic valve such as is commonly used in automatic train control systems and that the electro-pneumatic valve includes a timing valve, timing reservoir and whistle. Such valves are so designed that upon the de-energization of the controlling magnet the whistle is sounded, and at the expiration of a prescribed interval, say six seconds, the timing reservoir is vented to atmosphere and the automatic brake application effected. When a more restrictive signal is called to the engineman's attention by the indicators K and the sounding of the warning whistle, he may by reversing the position of the acknowledging switch M, suppress the whistle and forestall the automatic brake application provided that the prescribed time interval has not elapsed.

From the terminal board B one set of conductors 6 leads to the box J and another set of conductors 7 leads to a polarized plug connector H comprising a receptacle 8 mounted on the forward end of the locomotive and a plug 9 mounted on the rear of the forward vehicle. From thence the conductors 7 lead to a junction box 10 and divide into three different groups. One group 11 leads to the track signal receiver C mounted on the front end of the forward vehicle. Another group 12 leads to the cab signal indicators D of the forward vehicle. The third group comprises two conductors 13 and 14 which lead to a three-way, spring return switch E which comprises the acknowledging device of the forward vehicle and which controls through a stick relay F the suppression of a warning whistle sounded when the magnet G is de-energized.

It will be apparent that the operation of the locomotive equipment is precisely the same as the ordinary operation of such equipment when nothing is moved in advance of the locomotive except that the induced signals are received from the track circuit by the track receiver C from whence they are conducted to the terminal board B through the polarized plug connector H. Upon a change to a more restrictive cab indication, the signal is visible on the indicators K and D, and the magnet L is de-energized causing the warning whistle to sound and initiating an automatic train stop. The automatic train stop may, however, be defeated by reversing the acknowledging switch M before the expiration of the prescribed interval of time required to vent the timing reservoir of the electro-pneumatic locomotive valve. When the acknowledging switch is operated within the prescribed period, magnet L is re-energized through conductors 2 and 3 by means of suitable apparatus in box J, the locomotive warning whistle is suppressed, and the automatic train stop is forestalled. Furthermore, the acknowledgment by the locomotive engineman is independent of any acts performed on the forward vehicle.

However, after the more restrictive signal is received, the circuit including conductors 4 and 5 and magnet L being broken, no current flows through the corresponding conductors 13 and 14 in the acknowledging circuit on the forward vehicle, and magnet G is de-energized simultaneously with the de-energization of magnet L, sounding the warning whistle on the forward vehicle.

Furthermore, the acknowledgment by the engineer on the locomotive will not automatically re-energize magnet G.

After the change to a more restrictive indication has been made, there being no current in conductors 13 and 14, and hence no current in conductors 15 and 16 leading to the magnet of the stick relay F, contacts 17 and 18 are opened, as shown in the drawing; and the circuit including conductors 19 and 20 leading to magnet G is broken. Accordingly, when the engineer on the locomotive acknowledges by operating switch M, this operation does not re-energize magnet G. To suppress the warning whistle on the forward vehicle, acknowledging switch E must be operated subsequent to the acknowledgment by the locomotive engineer. When the switch E is so operated a circuit is completed through conductors 13 and 14 and conductors 21 and 22, re-energizing the stick relay and closing contacts 17 and 18. With contacts 17 and 18 closed, the return of switch E to normal position, by means of its spring return, re-energizes magnet G through conductors 19 and 20.

It will thus be seen that the combined apparatus requires an acknowledgment first by the locomotive engineer and then by an operator on the forward vehicle. If the engineer should become incapacitated, or for some other reason should fail to make proper acknowledgment of a less favorable cab signal indication, the operator on the forward vehicle will know that acknowledgment has not been made. Accordingly the provision of the auxiliary equipment on the forward vehicle serves to check the integrity of the engineer and to act as an additional safeguard against accident.

Furthermore, the auxiliary equipment on the forward vehicle is a comparatively simple and inexpensive apparatus which can readily be installed whenever occasion demands that a vehicle be pushed in advance of a locomotive.

Having thus described my invention, I claim:

1. An apparatus adapted for use on a railway vehicle moved ahead of another vehicle equipped with means responsive to wayside signals for producing a number of cab signal indications and means for acknowledging a change to a more restrictive indication; said apparatus comprising a track receiver, a cab indicator, a circuit including a device for acknowledging a change to a more restrictive indication, conductors leading from said track receiver, cab indicator and acknowledging circuit to the equipment on the vehicle in the rear, whereby the cab indicators on the forward and rear vehicle are operated simultaneously and complete acknowledgment is dependent upon acts performed on both vehicles.

2. An apparatus adapted for use on a railway vehicle moved ahead of another vehicle equipped with means responsive to wayside signals for producing a number of cab signal indications and means for acknowledging a change to a more restrictive indication; said apparatus comprising a track receiver, a cab indicator, a circuit including a device for acknowledging a change to a more restrictive indication, conductors leading from said track receiver, cab indicator and acknowledging circuit to the equipment on the vehicle in the rear, and means associated with said acknowledging device whereby when the circuit is de-energized it cannot again be energized until acknowledgment has been made on the vehicle in the rear.

3. An apparatus adapted for use on a railway vehicle moved ahead of another vehicle equipped with means responsive to wayside signals for producing a number of cab signal indications and means for acknowledging a change to a more restictive indication; said apparatus including a track receiver, an acknowledging circuit having an electrically controlled alarm and a device for suppressing said alarm, and means associated therewith whereby the alarm can only be suppressed when a similar acknowledgment has been made on the vehicle in the rear, and conductors leading from said track receiver and acknowledging circuit to the equipment on the vehicle in the rear.

4. An apparatus adapted for use in a railway vehicle moved ahead of another vehicle equipped with means responsive to wayside signals for producing a number of cab signal indications and means for acknowledging a change to a more restrictive indication; said apparatus including a track receiver and an acknowledging circuit having a relay-controlled magnet and a spring return switch, and conductors leading from said track receiver and acknowledging circuit to the equipment on the vehicle in the rear, whereby the cab indicators on the forward and rear vehicle are operated simultaneously and complete acknowledgment is dependent upon acts performed on both vehicles.

5. An apparatus adapted for use on a railway vehicle moved ahead of another vehicle equipped with means responsive to wayside signals for producing a number of cab signal indications and means for acknowledging a change to a more restrictive indication; said apparatus including a track receiver and an acknowledging circuit having a magnet, a relay associated with said magnet, a spring return switch, and means whereby said magnet when de-energized can only be re-energized by an acknokledgment made on the vehicle in the rear as well as by an operation of the spring return switch on the forward vehicle.

In testimony whereof, I have hereunto signed my name at Philadelphia, Pennsylvania, this 19th day of May, 1930.

JOHN A. C. KING.